VEHICLE SUSPENSION SPRING

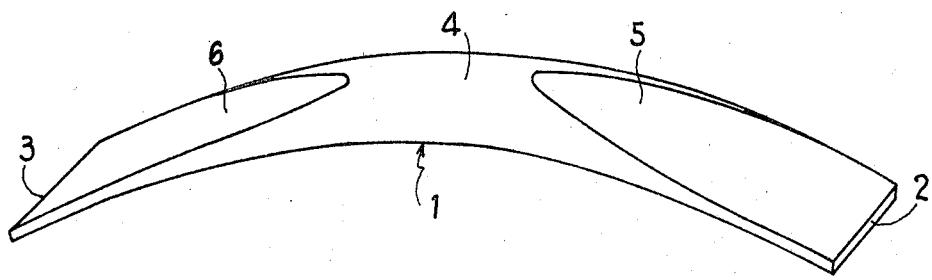
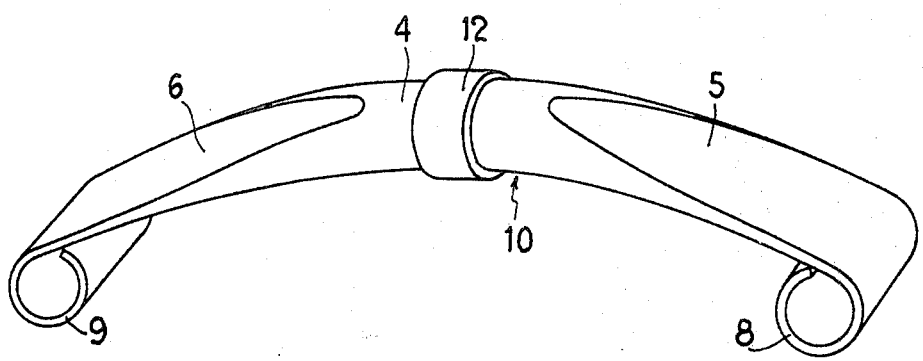
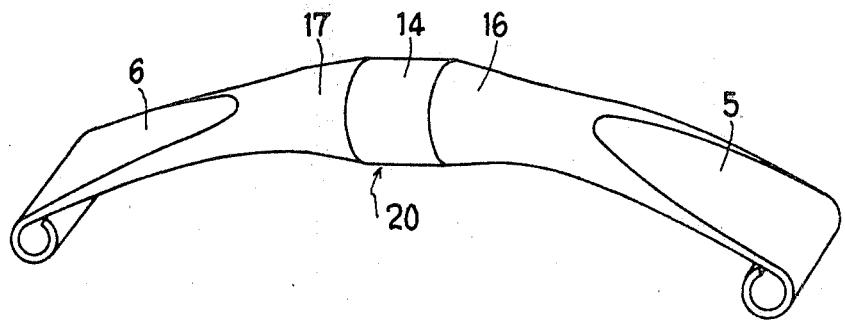

When designing leaf springs, and more particularly those employed for the suspension of vehicles, the first quality aimed at is high flexibility. For this purpose there is usually employed superimposed layers of leaves having several thicknesses, each leaf having a great width with respect to the thickness, or leaves which are thinned down progressively from their centre to their ends, the width thereof always being large with respect to the thickness. In this way, springs are obtained which have a large deforming capacity for the bending stresses they are subjected to.

Now, in most cases these springs are also subjected to torsional stress and their rectangular very flat section is ill-adapted to this type of stress.

An object of the present invention is to overcome this drawback and to provide a spring leaf which conserves the advantages of the conventional leaves having a rectangular section and adds thereto a high deforming capacity in respect of torsion.

The spring leaf according to the invention is constituted by a curved solid bar which has a circular cross section and is progressively thinned down in the direction of each of its ends so that the latter have substantially rectangular sections.

The circular section is that which permits the largest deformations under torsion whereas the substantially rectangular section of the ends facilitates the deformation under bending stresses.

It must be understood that the invention also embraces springs for the suspension of vehicles and comprising an assembly of leaves of this type at least one of which leaves has ends which are wound round to form eyes for fixing the spring or curved in the form of slides for bearing on the shoes of the vehicle.

The following description of one embodiment, given solely by way of example and to which the invention is not intended to be limited, with reference to the accompanying drawings will show the advantages and features of the invention.

In the drawings:

FIG. 1 is a perspective view of a spring leaf according to the invention;

FIG. 2 is a perspective view of a modification of this spring leaf;

FIG. 3 shows another modification;

Figure 4:
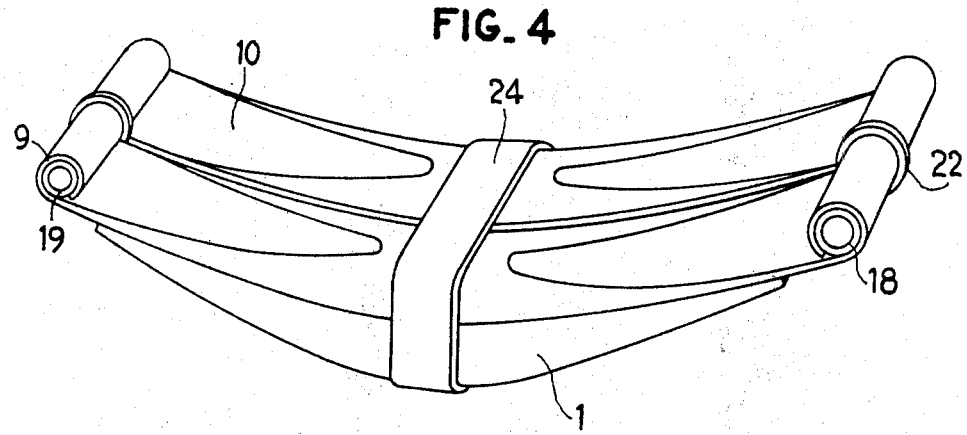
FIG. 4 is a perspective view of a spring constituted by a plurality of leaves according to the invention.
Figure 5:
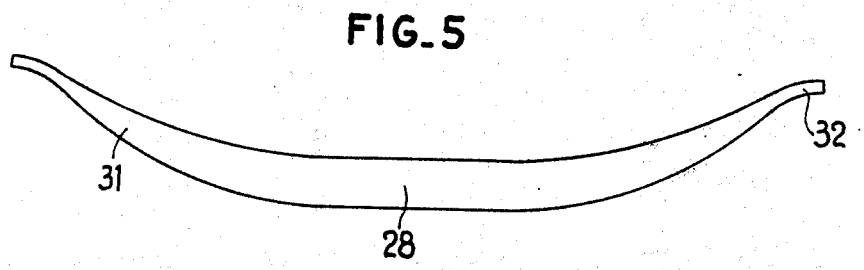
FIG. 5 is a side elevational view of another spring.
Figure 6:
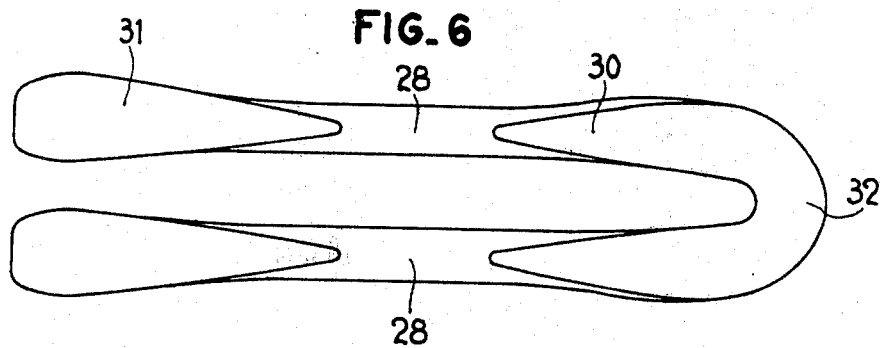
FIG. 6 is a plan view of the spring shown in FIG. 5.

The spring leaf 1 shown in FIG. 1 is constituted by a solid bar which has a circular section and is curved in the direction of its length. This bar is progressively thinned down in the direction of each of its ends 2 and 3 respectively and thus has on each side of a centre part 4 two flattened wing portions 5 and 6 which taper and progressively widen. At the ends 2 and 3 the section of the wing portions has substantially the shape of a rectangle whose large side has a length distinctly greater than the diameter of the centre part 4.

Preferably, when this spring leaf is adapted to constitute the main leaf 10 of a suspension spring of a vehicle, the ends 2 and 3 are extended by portions having a constant section which are wound onto themselves so as to form eyes 8 and 9 for fastening to the vehicle. A collar 12 is mounted around the centre part 4 and is preferably cylindrical and provided with means (not shown) for fastening, for example, to the axle of the vehicle.

When a force is exerted on the convex side of the centre part of such a leaf spring the latter tends to bend and each of its sections is subjected to a bending moment which is proportional to the distance between it and the corresponding end 2 or 3 or eye 8 or 9. This section must therefore have a modulus of inertia proportional to this distance so as to permit an even distribution of the stresses throughout the leaf.

The widening of the leaf due to its flattening affords an effective variation of the section of the leaf which consequently has a high deforming capacity under bending stress.

Moreover, when the means for fastening the spring are introduced in the eyes 8 and 9 and maintained in a rigid manner on the vehicle and the unevenness of the road subjects these eyes to various movements so that the leaf undergoes variable bending and torsional stresses, the substantially cylindrical shape of the centre part 4 of leaf enables it to twist. The eyes 8 and 9 most often remain parallel to each other but the centre collar 12 turns with respect to the axes of these eyes so that the leaf is twisted and turns inside this collar 12 which is facilitated by its cylindrical shape. The spring thus has a good deforming capacity under torsion.

However, in some cases it might be preferable, in order to improve the distribution of the stresses, to give a cylindrical only to the part 14 of the leaf which supports the collar and to vary the area of the circular sections between this cylindrical part and the two flattened wing portions 5 and 6. The leaf 20 is then constructed as shown in FIG. 3 in which it comprises a centre cylindrical portion 14 extended at each end by a truncated cone 16, 17. The cylindrical portion 14 corresponds to the large base of the truncated cone and it is only beyond the small base of this truncated cone that the flattened wing portions 5 and 6 of the leaf start. The length of these wing portions is reduced with respect to the length of the spring leaf of the embodiment shown in FIGS. 1 and 2.

A suspension spring for a vehicle may be constituted by a single of the leaves 1, 10 or 20 shown in FIGS. 1–3 but it may also comprise both a leaf provided with means such as eyes or slides for connection to the vehicle and one or more leaves 1. The collar 12 is then disposed around all the leaves.

The spring may even comprise two leaves 10 or 20 (FIG. 4) which are juxtaposed and are each provided with two fastening eyes 8 and 9. The eyes 8 or 9 of the two leaves are placed in end to end relation and a common tubular sleeve 18, 19 extends therethrough, this sleeve being preferably provided in its centre part with a collar 22 against which the facing ends of the two eyes 8 or 9 abut. The two leaves 10 or 20 are thus integral with each other at each end and are surrounded in their centre part by a collar 24 for connection to the axle of the vehicle. These leaves may moreover be associated with leaves 1 without an eye, mounted in their lower part and clamped thereagainst by the collar 24 which surrounds them in their centre part and is fixed by any suitable means to the axle of the vehicle. Means for preventing the longitudinal displacement of the leaves may also be provided on this collar. The number and arrangement of leaves 10, 20

United States Patent [19]
Peterson

[11] 3,975,006

[45] Aug. 17, 1976

[54] IMPACT KINETIC ENERGY ABSORBER

[76] Inventor: Gerald H. Peterson, 901 Sherman, Apt. 518, Denver, Colo. 80203

[22] Filed: Jan. 17, 1975

[21] Appl. No.: 542,131

Related U.S. Application Data

[63] Continuation of Ser. No. 356,247, May 1, 1973, and a continuation of Ser. No. 433,612, Jan. 15, 1974, which is a continuation of Ser. No. 248,236, April 27, 1972.

[52] U.S. Cl. .................................. 267/139; 293/70; 188/1 C
[51] Int. Cl.² ............................................. F16F 7/12
[58] Field of Search ........... 267/116, 139, 140, 152, 267/153; 293/1, 60, 85, 89, 70; 188/1 C

[56] References Cited
UNITED STATES PATENTS

| | | | |
|---|---|---|---|
| 3,494,607 | 2/1970 | Rusch | 267/116 |
| 3,588,159 | 6/1971 | Duckett | 293/70 |
| 3,659,835 | 5/1972 | Peterson | 267/136 |
| 3,695,665 | 10/1972 | Matsuura | 293/70 |

*Primary Examiner*—James B. Marbert
*Attorney, Agent, or Firm*—Beveridge, Degrandi, Kline & Lunsford

[57] ABSTRACT

An impact kinetic energy absorber with automatic return in which the kinetic energy of impact is applied to an impact receiving container having a movable wall and substantially filled with plastic material which on impact is forced to be extruded through an orifice into a second plastic receiving container also substantially filled with plastic material so that on impact plastic material is extruded through said orifice to absorb kinetic energy and plastic material is compressed in said second container, which compressed plastic, after said impact forces plastic material to be extruded back through said orifice to return said impact receiving container and movable wall to the original position. In one embodiment a spring returns the plastic material to its pre-impact receiving position so that the plastic material is under a pressure below its yield point except only for that portion of the plastic that is being forced back through the orifice to return to its original pre-impact position.

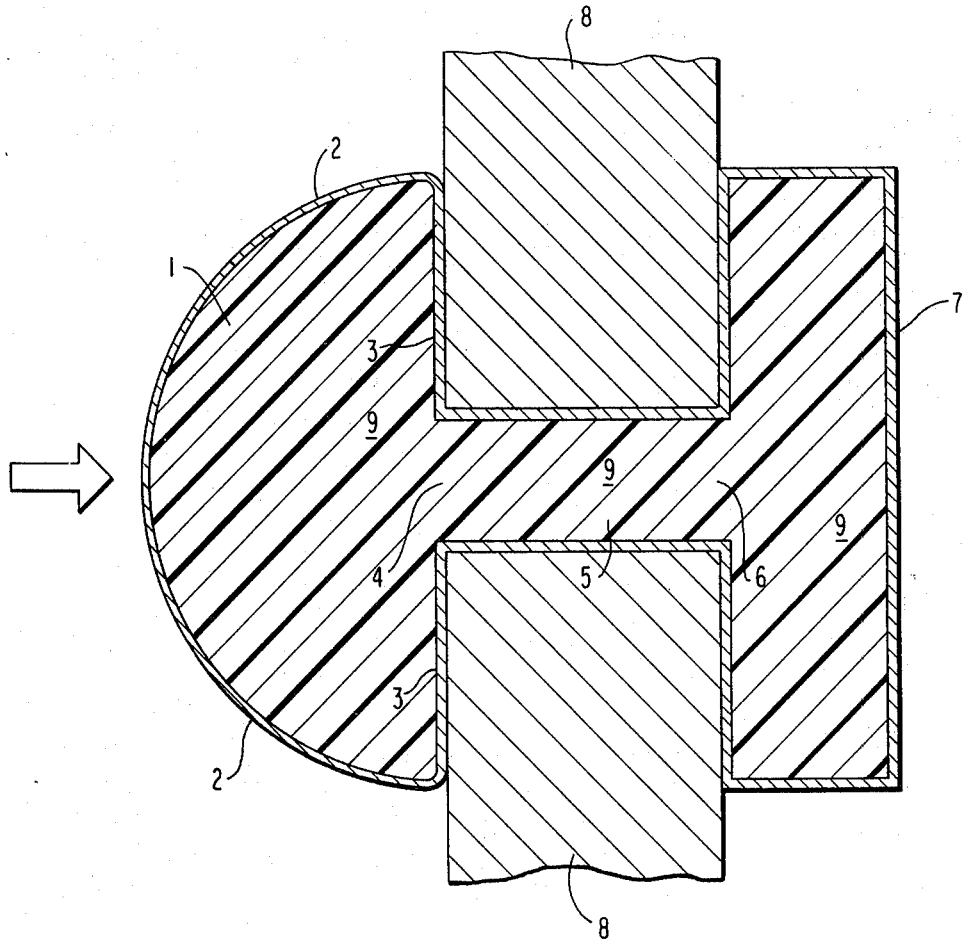

8 Claims, 2 Drawing Figures